(12) United States Patent
Uemura et al.

(10) Patent No.: US 8,910,473 B2
(45) Date of Patent: Dec. 16, 2014

(54) PIPE LAYER AND WARM-UP METHOD FOR PIPE LAYER

(75) Inventors: Takuya Uemura, Hirakata (JP);
Yasuhiko Takeuchi, Katano (JP);
Takashi Noda, Hirakata (JP)

(73) Assignee: Komatsu Ltd., Tokyo (JP)

( * ) Notice: Subject to any disclaimer, the term of this patent is extended or adjusted under 35 U.S.C. 154(b) by 180 days.

(21) Appl. No.: 13/641,053

(22) PCT Filed: Dec. 21, 2011

(86) PCT No.: PCT/JP2011/079660
§ 371 (c)(1),
(2), (4) Date: Oct. 12, 2012

(87) PCT Pub. No.: WO2012/086695
PCT Pub. Date: Jun. 28, 2012

(65) Prior Publication Data
US 2013/0026431 A1 Jan. 31, 2013

(30) Foreign Application Priority Data
Dec. 21, 2010 (JP) ................................. 2010-284641

(51) Int. Cl.
*F16D 31/00* (2006.01)
*B66C 23/44* (2006.01)
*B66D 1/44* (2006.01)
*F16L 1/028* (2006.01)
*F15B 21/04* (2006.01)

(52) U.S. Cl.
CPC . *B66C 23/44* (2013.01); *B66D 1/44* (2013.01); *F16L 1/028* (2013.01); *F15B 21/042* (2013.01); *Y10S 60/905* (2013.01)
USPC ..................... 60/329; 60/456; 60/905; 91/419

(58) Field of Classification Search
CPC ........ F15B 21/042; F15B 21/045; B66D 1/44
USPC ......... 60/329, 456, 905, 445; 242/390.6, 414; 91/419, 431
See application file for complete search history.

(56) References Cited

U.S. PATENT DOCUMENTS

| | | | | |
|---|---|---|---|---|
| 3,969,897 A | * | 7/1976 | Humphreys et al. | 60/456 |
| 4,043,125 A | * | 8/1977 | Kubik | 60/406 |
| 4,048,799 A | * | 9/1977 | Golan et al. | 60/413 |

(Continued)

FOREIGN PATENT DOCUMENTS

| | | |
|---|---|---|
| JP | 2-35164 B2 | 8/1990 |
| JP | 2715180 B2 | 11/1997 |

(Continued)

*Primary Examiner* — Edward Look
*Assistant Examiner* — Michael Quandt
(74) *Attorney, Agent, or Firm* — Global IP Counselors, LLP (57) ABSTRACT

A warm-up pilot pressure control unit adjusts pilot pressure inputted to a first flow channel open/close unit so that the flow channel open/close unit is switched to an open state when a warm-up start state is entered under the necessary condition that a first winch operation member is in a neutral position. When the first flow channel open/close unit is in the open state, a first pump displacement adjustment unit adjusts the displacement of a first hydraulic pump so that the differential pressure between a first pump hydraulic circuit and a first warm-up hydraulic circuit becomes constant at a predetermined set pressure.

3 Claims, 3 Drawing Sheets

(56) References Cited

U.S. PATENT DOCUMENTS

| | | | | |
|---|---|---|---|---|
| 4,129,987 | A | * | 12/1978 | Blume .............................. 60/445 |
| 4,278,155 | A | * | 7/1981 | Golan et al. ................... 192/225 |
| 4,354,351 | A | * | 10/1982 | Dezelan .......................... 60/456 |
| 4,373,869 | A | * | 2/1983 | Martin et al. ................. 417/213 |
| 5,251,440 | A | * | 10/1993 | Bong-dong et al. ............. 60/329 |
| 5,735,506 | A | * | 4/1998 | Warnan et al. ................ 254/361 |
| 8,167,154 | B2 | * | 5/2012 | Heidrich et al. .............. 212/289 |
| 8,234,860 | B2 | * | 8/2012 | Beschorner et al. ............ 60/329 |

FOREIGN PATENT DOCUMENTS

| | | |
|---|---|---|
| JP | 10-274212 A | 10/1998 |
| JP | 11-108015 A | 4/1999 |
| JP | 2000-74011 A | 3/2000 |
| JP | 2003-239907 A | 8/2003 |
| JP | 2010-47421 A | 3/2010 |

* cited by examiner

PIPE LAYER AND WARM-UP METHOD FOR PIPE LAYER

CROSS-REFERENCE TO RELATED APPLICATIONS

This application claims priority to Japanese Patent Application No. 2010-284641 filed on Dec. 21, 2010, the disclosure of which is hereby incorporated herein by reference in its entirety.

TECHNICAL FIELD

The present invention relates to a pipe layer and a warm-up method for a pipe layer.

BACKGROUND ART

A pipe layer is a work vehicle used for installing pipes at petroleum and natural gas delivery pipeline construction sites and the like. For example, at a pipeline construction site, multiple pipe layers are lined up in a row and the pipe layers wind up a wire using a winch to lift up the pipes. The winch is coupled with a hydraulic motor and rotated by hydraulic pressure.

A warm-up is performed to raise the temperature of the hydraulic fluid in typical hydraulic driven machines such as hydraulic excavators and the like. The warm-up generates a pressure loss to cause the hydraulic fluid temperature to be raised by causing the hydraulic fluid to pass through a throttle provided in a hydraulic circuit. Alternatively, the hydraulic fluid temperature may be raised by causing the hydraulic fluid to pass through a narrowed control valve in which the opening area is reduced.

For example, the hydraulic drive device described in Japanese Examined Patent Application Publication No. H2-35164 includes a directional switching valve. The directional switching valve adjusts the flow rate of hydraulic fluid supplied to a hydraulic cylinder. Then, when the opening area of the directional switching valve is reduced by narrowing, the temperature of the hydraulic fluid rises. Additionally, the hydraulic drive device includes an electromagnetic proportional control valve for controlling the opening area of the directional switching valve, and a control circuit that outputs control signals to the electromagnetic proportional control valve. The control circuit finely controls the opening area of the directional switching valve by optimally controlling the electromagnetic proportional control valve on the basis of a detected temperature of the hydraulic fluid.

Further, a hydraulic drive machine described in Japanese Patent No. 2715180 causes the hydraulic fluid temperature to be raised by reducing an opening area of a variable orifice by narrowing. The variable orifice has a solenoid and the opening area is changed in response to a signal input to the solenoid from a controller. The controller controls the variable orifice on the basis of information such as the displacement of an electrically operated lever, the rotational speed of the engine, or the hydraulic fluid temperature and the like.

SUMMARY

When performing a warm-up by narrowing a predetermined opening ratio of an opening area of a control valve, a desired value of the opening area must be set precisely in order to ensure a hydraulic fluid flow rate necessary for the warm-up. However, the opening area is affected by the amount of strokes of a spool in the control valve. The spool stroke amount may easily lead to variation in the opening area since variation occurs easily due to the dimensional accuracy of members of the control valve and due to the accuracy of the control. Furthermore, pipe layers may be used in extremely cold environments where the temperature falls below −40 degrees Celsius. In such an extremely cold environment, the reliability of computing devices such as microcomputers and of electronic control devices such as electromagnetic proportional control valves and the like is reduced. As a result, conducting fine adjustments on the opening area using electronically controlled devices such as those described above is difficult.

Further, an occasion in which a warm-up of the pipe layer is required is not limited to only starting the engine of the pipe layer. The winch may be re-operated after the pipe layer has stopped the winch and held the winch in a state of lifting a pipe for a long period of time. As a result, the pipe layer requires warming up to be performed while holding the state in which the pipe is raised. However, normally the engine in a typical hydraulic drive machine is in an idling state when in a non-operating state. In an idling state, the rotational speed of the engine is reduced and the load on the hydraulic actuator of the machinery is low. As a result, the flow rate of the hydraulic fluid discharged from a hydraulic pump is reduced. When this type of state occurs while holding a state in which the pipe layer is lifting the pipe, a suitable amount of hydraulic fluid cannot be sent to a control valve or a throttle. As a result, it is difficult to generate an adequate amount of heat for the warm-up.

An object of the present invention is to provide a pipe layer and a warm-up method for a pipe layer that can reliably perform a warm-up even in an extremely cold environment and ensure an adequate amount of heat while holding a state in which the pipe layer is lifting a pipe.

A pipe layer according to a first aspect of the present invention includes an engine, a hydraulic pump, a hydraulic motor, a winch, a winch operation member, a pump hydraulic circuit, a drive hydraulic circuit, a warm-up hydraulic circuit, a flow rate control unit, a drive pilot pressure control unit, a flow channel open/close unit, a warm-up pilot pressure control unit, and a pump displacement adjustment unit. The hydraulic pump is driven by the engine. The hydraulic motor is driven by hydraulic fluid discharged from the hydraulic pump. The winch is driven by the hydraulic motor. The winch operation member is a member for operating the winch. The pump hydraulic circuit is connected to the hydraulic pump and is a hydraulic circuit through which passes hydraulic fluid discharged from the hydraulic pump. The drive hydraulic circuit is connected to the hydraulic motor and is a hydraulic circuit through which passes hydraulic fluid for driving the hydraulic motor. The warm-up hydraulic circuit is provided with a pressure loss portion and is a hydraulic circuit through which passes hydraulic fluid for warming up the hydraulic motor. The flow rate control unit is provided between the pump hydraulic circuit and the drive hydraulic circuit and adjusts the flow rate of the hydraulic fluid sent from the pump hydraulic circuit to the drive hydraulic circuit in response to an inputted pilot pressure. The drive pilot pressure control unit adjusts the pilot pressure inputted to the flow rate control unit in response to operation of the winch operation member. The flow channel open/close unit is provided between the pump hydraulic circuit and the warm-up hydraulic circuit and switches between an open state and a closed state in response to an inputted pilot pressure. The flow channel open/close unit allows the pump hydraulic circuit and the warm-up hydraulic circuit to communicate in the open state. The flow channel open/close unit disconnects the pump hydraulic circuit and the warm-up hydraulic circuit in the closed state. The warm-up pilot pressure control unit adjusts the pilot pressure inputted to the flow channel open/close unit so that the flow channel open/close unit is switched to the open state when a warm-up start state is entered under the necessary condition that the winch operation member is in a neutral position. The pump displacement adjustment unit adjusts the displacement of the pump an that the differential pressure between the pump hydraulic circuit and the drive hydraulic circuit becomes constant at a predetermined set pressure when the flow channel open/close unit is in the closed state. The pump displacement adjustment unit adjusts the displacement of the pump so that the differential pressure between the pump hydraulic circuit and the warm-up hydraulic circuit becomes constant at a predetermined set pressure when the flow channel open/close unit is in the open state.

A pipe layer according to a second aspect of the present invention is the pipe layer of the first aspect and further includes a warm-up permission operating member that is operated in a permitted state in which the open state of the flow channel open/close unit is permitted and in a non-permitted state in which the open state of the flow channel open/close unit is not permitted. The warm-up start state further includes the warm-up permission operating member in the permitted state.

A pipe layer according to a third aspect of the present invention is the pipe layer of the first aspect wherein, when the flow channel open/close unit is in the open state, the flow channel open/close unit enters the closed state if the winch operation member is moved to a position other than the neutral position.

A warm-up method for a pipe layer according to a fourth aspect of the present invention includes the following processes. First, the winch is wound up and the pipe is lifted by operating the winch operation member. Next, the winch is stopped and the pipe is held in a lifted state according to a placement of the winch operation member to a neutral position. Furthermore, the pipe layer enters the warm-up start state under the necessary condition that the winch operation member is in the neutral position, and when the state in which the pipe is lifted is held, the pipe layer warms up.

A pipe layer according to a first aspect of the present invention switches between execution and stoppage of a warm-up by switching the flow channel open/close unit between an open state and a closed state. Thus, fine adjusting of the opening area of the flow channel open/close unit is not required. Since the fine adjusting of the opening area is not required, control of the flow channel open/close unit can be carried out by a hydraulic pressure pilot without relying on an electronic device. As a result, a reliable warm-up can be conducted even in an extremely cold environment. Further, the displacement of the pump is adjusted in the pipe layer so that the differential pressure between the pump hydraulic circuit and the drive hydraulic circuit becomes constant at a predetermined set pressure when the flow channel open/close unit is in the open state. Specifically, when a warm-up is being conducted, the displacement of the hydraulic pump can be adjusted in response to a load pressure on the warm-up hydraulic circuit for warm-up even when the rotational speed of the engine is reduced. Therefore, a hydraulic fluid flow rate required for warm-up can be assured even when the pipe layer stops the hydraulic motor and is holding a pipe in a lifted state. As a result, an adequate amount of heat can be assured while the pipe layer is holding the pipe in the lifted state.

The pipe layer according to the second aspect of the present invention allows for the setting of permission and non-permission of executing a warm-up in accordance with the operator operating a warm-up permission operating member.

In a pipe layer according to the third aspect of the present invention, the flow channel open/close unit enters the closed state if the winch operation member is moved to a position other than the neutral position during a warm-up. As a result, the loss of power due to the warm-up procedure can be avoided while the winch is being operated.

In a pipe layer warm-up method according to the fourth aspect of the present invention, a hydraulic fluid flow rate required for warm-up can be assured when the hydraulic motor is stopped and the pipe layer is holding a pipe in a lifted state.

DESCRIPTION OF EMBODIMENTS

Figure 1:
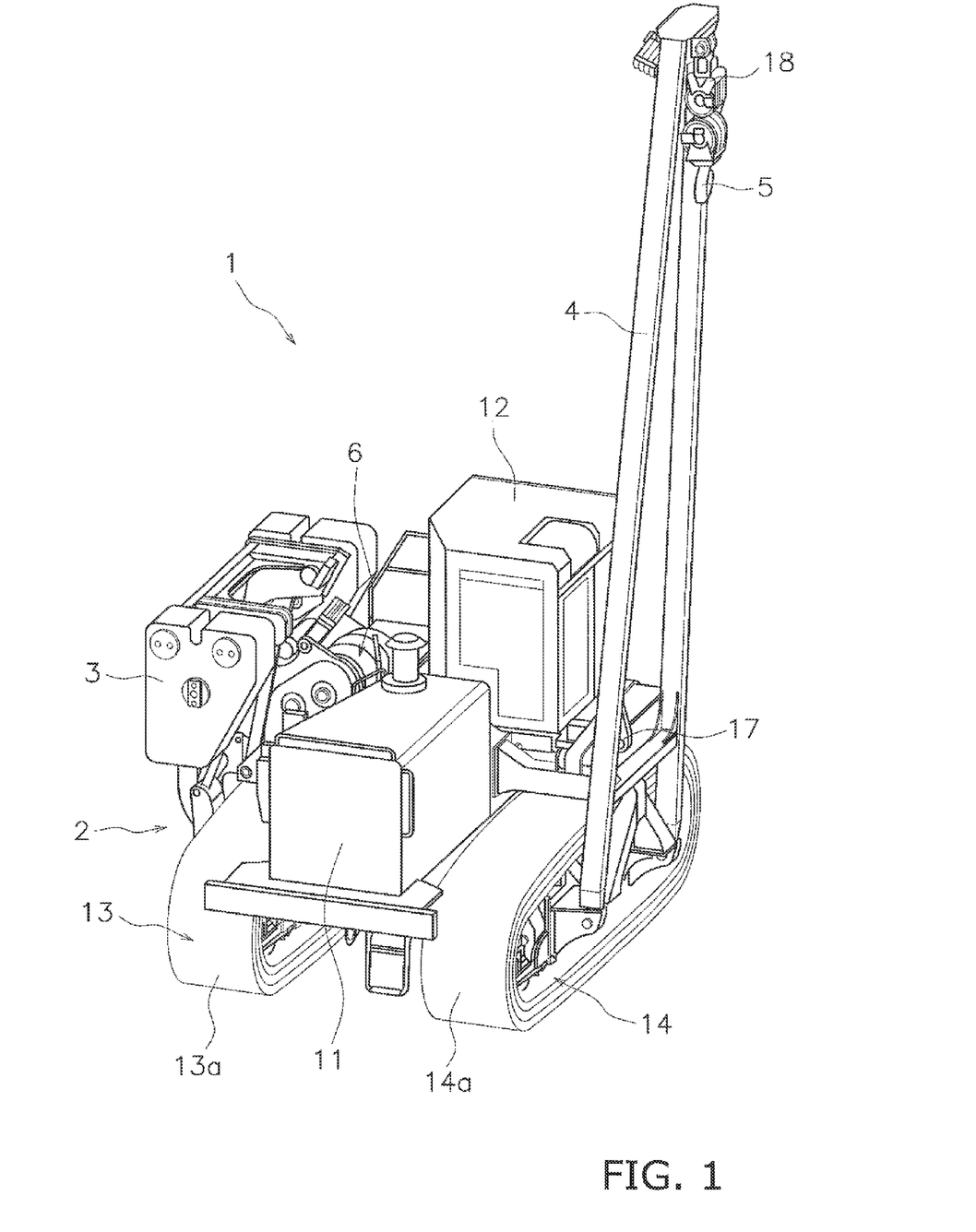
FIG. 1 is a perspective view of a pipe layer.

A pipe layer 1 according to the first embodiment of the present invention is shown in FIG. 1. FIG. 1 is a perspective view showing the appearance of the pipe layer 1. The pipe layer 1 includes a vehicle body 2, a counterweight 3, a boom 4, a hook 5, and a winch device 6. To facilitate understanding of the drawing, a belowmentioned first wire 101 and a second wire 102 are omitted from FIG. 1.

The vehicle body 2 includes an engine compartment 11, a cab 12, and a pair of travel devices 13 and 14. A belowmentioned engine 30 is disposed in the engine compartment 11. The cab 12 and other devices such as hydraulic pumps 29, 31, 41 (see FIG. 3) are disposed rearward of the engine compartment 11. The travel devices 13 includes crawler belt 13a. The travel devices 14 includes crawler belt 14a. The pipe layer 1 travels due to the crawler belts 13a and 14a being driven by a driving force from the engine 30.

Figure 2:
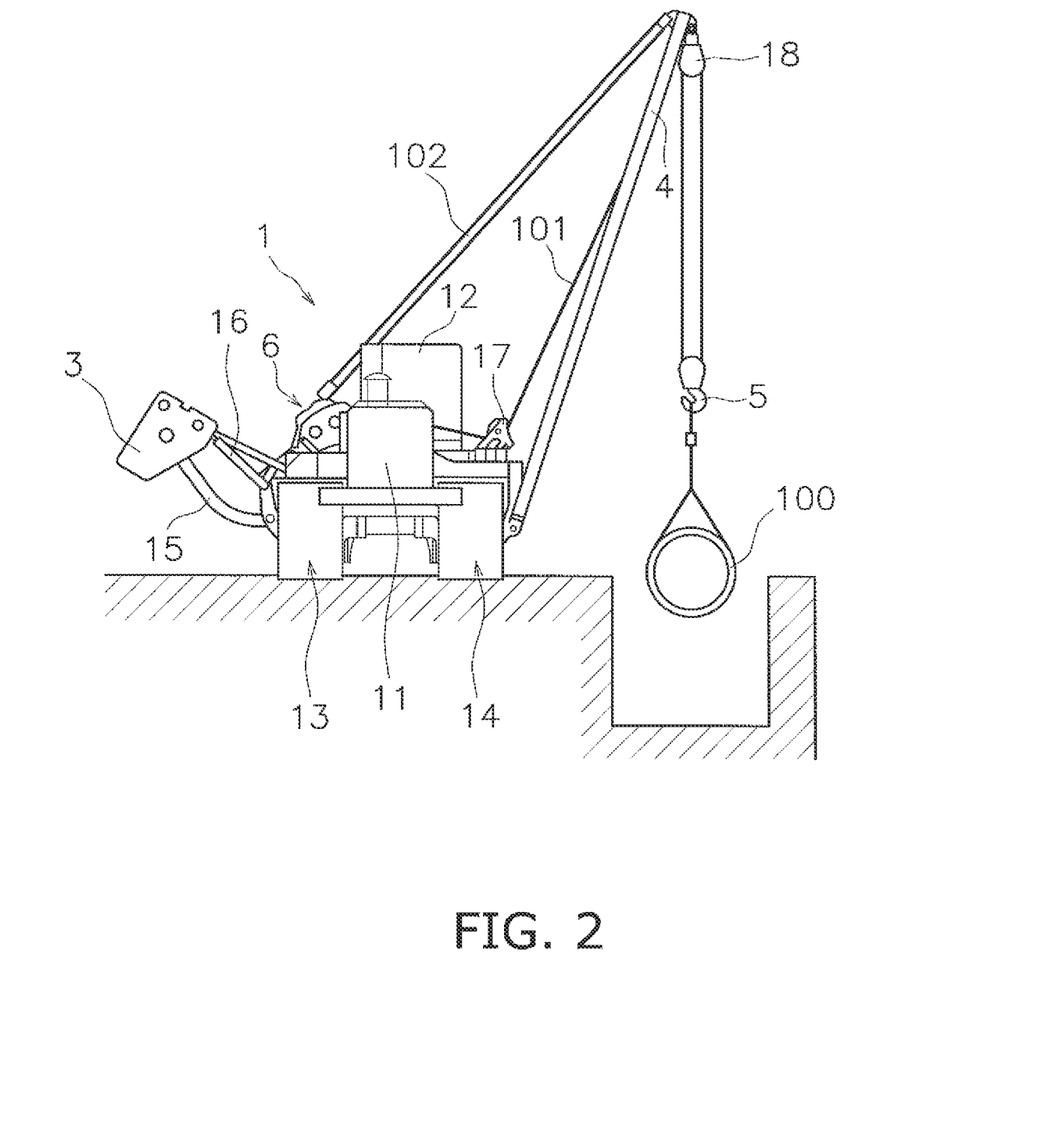
FIG. 2 is an elevation showing a working state of a pipe layer.

The counterweight 3 is mounted on one lateral side portion of the vehicle body 2. FIG. 2 is an elevation showing a state in which the pipe layer 1 is conducting installation work of a pipe 100. The counterweight 3 is mounted on the vehicle body 2 via an arm member 15. The counterweight 3 is provided in a moveable manner due to a hydraulic cylinder 16. The pipe layer 1 can maintain balance of the body by adjusting the distance of the counterweight 3 from the vehicle body 2.

The boom 4 is mounted on another lateral side portion of the vehicle body 2. Specifically, the boom 4 is mounted on the side of the vehicle body 2 that is opposite the side on which the counterweight 3 is mounted. A lower portion of the boom 4 is pivotably mounted with respect to the vehicle body 2. A first pulley 18 is attached to an upper portion of the boom 4. The first pulley 18 supports the first wire 101 coupled with the hook 5. A second pulley 17 is disposed on an upper side of the boom 4 side of the vehicle body 2. The first wire 101 coupled with the hook 5 extends through the first pulley 18 and the second pulley 17 to a belowmentioned first winch 21. The second wire 102 that extends from a belowmentioned second winch 22 is coupled at the upper portion of the boom 4.

Figure 3:
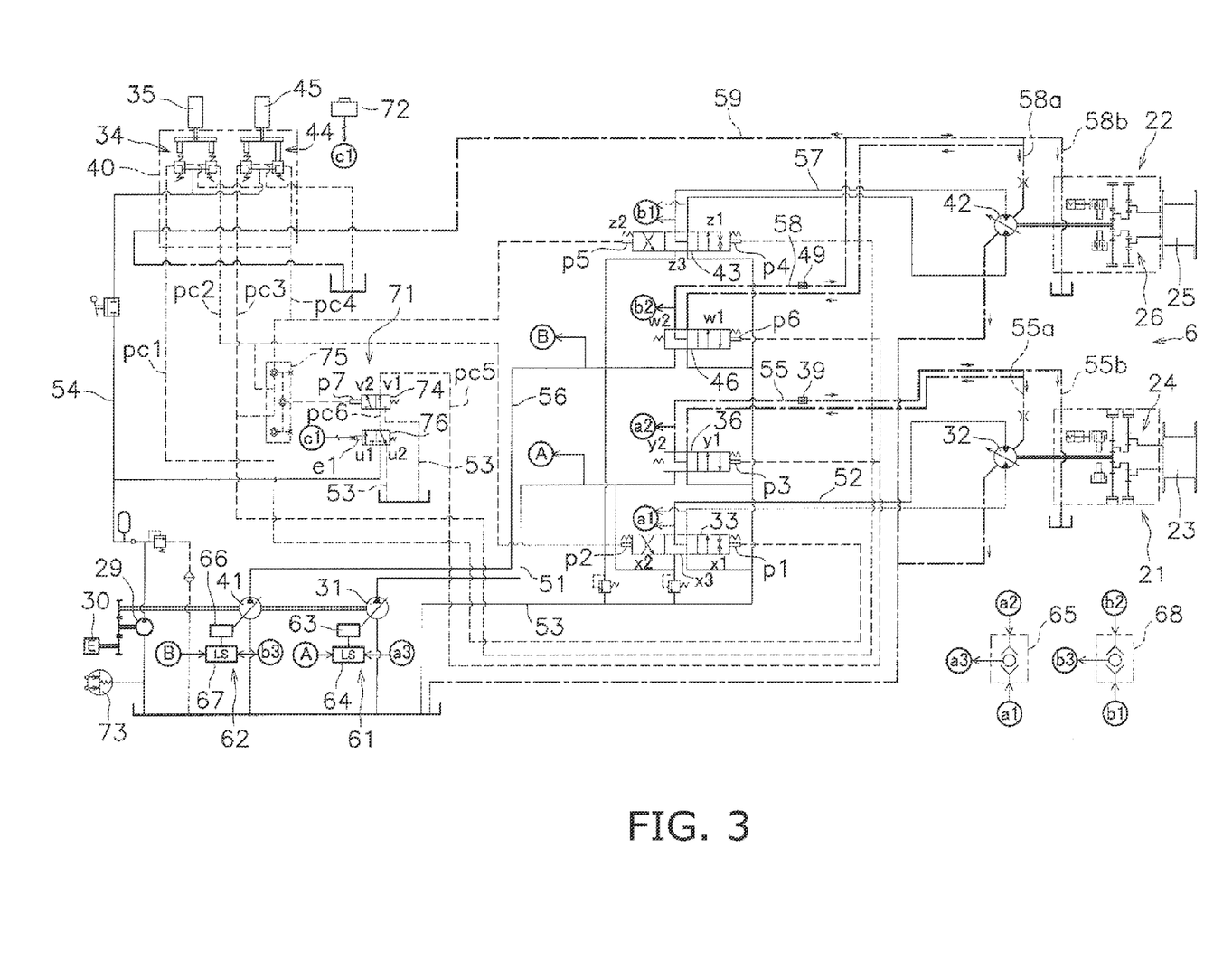
FIG. 3 is a schematic view showing hydraulic circuits included in a pipe layer.

FIG. 3 is a schematic view showing a hydraulic drive system included in the pipe layer 1. As illustrated in FIG. 3, the winch device 6 includes the first winch 21 and the second winch 22.

The first winch 21 includes a first drum 23 and a first reducer 24. The abovementioned first wire 101 is wound onto the first drum 23. The first reducer 24 decelerates the driving power from a belowmentioned first hydraulic motor 32 and transfers the driving power to the first drum 23. The hook 5 shown in FIG. 1 and FIG. 2 is raised and lowered due to the winding up or winding down of the first wire 101 by the first winch 21. Consequently, the pipe layer 1 is able to lift and lower the pipe 100 suspended by the first wire 101 and the hook 5 as shown in FIG. 2. In the following explanation, winding up means the rotation of the winch in a direction that causes the hook 5 or the boom 4 to rise. Furthermore, winding down means the rotation of the winch in a direction that causes the hook 5 or the boom 4 to descend.

The second winch 22 includes a second drum 25 and a second reducer 26. The abovementioned second wire 102 is wound onto the second drum 25. The second reducer 26 decelerates the driving power from a belowmentioned second hydraulic motor 42 and transfers the driving power to the second drum 25. The boom 4 is rocked up and down due to the winding up or winding down of the second wire 102 by the second winch 22. As a result, the pipe layer 1 is able to change the installation position of the pipe 100.

The following is an explanation of the hydraulic drive system of the pipe layer 1 with reference to FIG. 3. The hydraulic drive system of the pipe layer 1 includes the engine 30, a first hydraulic pump 31, the first hydraulic motor 32, a first flow rate control unit 33, a first drive pilot pressure control unit 34, a first winch operation member 35, and a first flow channel open/close unit 36.

The engine 30 is a diesel engine and output of the engine 30 is controlled by adjusting the injection amount of fuel from a fuel injection pump which is not shown. Adjusting the fuel injection amount is conducted by controlling the fuel injection pump with a mechanical governor. Generally, an all-speed control system of governor is used as the mechanical governor so that the engine rotational speed and the fuel injection amount are adjusted according to a load due to a centrifugal action. Specifically, the governor increases and decreases the fuel injection amount by displacing a pair of centrifugal weights attached to a rotating shaft coupled to an output shaft of the engine 30.

An engine rotational speed setting member is disposed in the abovementioned cab 12. The engine rotational speed setting member is, for example, a levered input device which is operated by the operator to manually set a target rotational speed of the engine 30. When the engine rotational speed setting member is operated, the fuel injection amount is adjusted in response to the load so that a set target engine rotational speed is maintained by the operation amount of the engine rotational speed setting member.

The first hydraulic pump 31 is driven by the engine 30 and discharges hydraulic fluid. A first pump hydraulic circuit 51 is connected to the first hydraulic pump 31. The first pump hydraulic circuit 51 is a hydraulic circuit through which passes hydraulic fluid discharged from the first hydraulic pump 31. The first hydraulic pump 31 is a variable displacement type of hydraulic pump that can control displacement by controlling the tilt angle of a swash plate. The displacement of the first hydraulic pump 31 is controlled by a belowmentioned first pump displacement adjustment unit 61. In the following explanation, the displacement of the hydraulic pump means a discharge amount of the hydraulic fluid per one rotation of the hydraulic pump, and is determined by the angle of the swash plate. Furthermore, a discharge flow rate of a hydraulic pump means the discharge amount of the hydraulic fluid per unit of time. The discharge flow rate is determined by the angle of the swash plate and the rotational speed of the hydraulic pump when the hydraulic pump is a variable displacement type.

The first hydraulic motor 32 is driven by hydraulic fluid from the first hydraulic pump 31. The first hydraulic motor 32 drives the first winch 21. A first drive hydraulic circuit 52 is connected to the first hydraulic motor 32. The first drive hydraulic circuit 52 is a hydraulic circuit through which passes the hydraulic fluid for driving the first hydraulic motor 32. The first hydraulic motor 32 is supplied with the hydraulic fluid from the first hydraulic pump 31 via the first drive hydraulic circuit 52.

The first flow rate control unit 33 is provided between the first pump hydraulic circuit 51 and the first drive hydraulic circuit 52. The first flow rate control unit 33 is a pressure proportional control valve and adjusts the flow rate of the hydraulic fluid fed from the first pump hydraulic circuit 51 to the first drive hydraulic circuit 52 according to a pilot pressure inputted to pilot ports p1 and p2. The first flow rate control unit 33 is switched between states x1, x2, x3 according to the pilot pressure inputted to the pilot ports p1 and p2. In the state x1, the first flow rate control unit 33 drives the first hydraulic motor 32 in the direction for the first winch 21 to wind up the first wire 101. In the state x2, the first flow rate control unit 33 drives the first hydraulic motor 32 in the direction for the first winch 21 to wind down the first wire 101. In the state x3, the first flow rate control unit 33 disconnects the first drive hydraulic circuit 52 from the first pump hydraulic circuit 51 and connects the first drive hydraulic circuit 52 to a tank circuit 53. Therefore, when the first flow rate control unit 33 is in the x3 state, the first hydraulic motor 32 is not driven and the first winch 21 enters a stopped state.

The first drive pilot pressure control unit 34 is a pressure proportional control valve and adjusts the pilot pressure inputted to the pilot ports p1 and p2 of the first flow rate control unit 33 according to the operation of the first winch operation member 35. The first winch operation member 35 is disposed in the cab 12 and is a member for the operator to operate the first winch 21. The first winch operation member 35 is, for example, a lever member. The first winch operation member 35 is operable at a raised operating position, a lowered operating position, and a neutral position. The first drive pilot pressure control unit 34 is disposed between a third pump hydraulic circuit 54 and pilot pressure circuits pc1 and pc2. The third pump hydraulic circuit 54 is connected to a third hydraulic pump 29. The pilot pressure circuits pc1 and pc2 are respectively connected to the pilot ports p1 and p2 of the first flow rate control unit 33.

The first flow channel open/close unit 36 is provided between the first pump hydraulic circuit 51 and a first warm-up hydraulic circuit 55. The first warm-up hydraulic circuit 55 is a hydraulic circuit through which hydraulic fluid for warming up the first hydraulic motor 32 passes, and is provided with a throttle 39 as a first pressure loss portion. The hydraulic fluid flowing through the first warm-up hydraulic circuit 55 becomes heated by passing through the throttle 39. The first warm-up hydraulic circuit 55 branches into a first motor warm-up circuit 55a and a first winch warm-up circuit 55b. The first motor warm-up circuit 55a passes through the inside of the first hydraulic motor 32. The first winch warm-up circuit 55b passes through the inside of the first winch 21. The first flow channel open/close unit 36 is a directional control valve and is switched between an open state y1 and a closed state y2 according to a pilot pressure inputted to the pilot port p3. The first flow channel open/close unit 36 allows the first pump hydraulic circuit 51 and a first warm-up hydraulic circuit 55 to communicate in the open state y1. When the first flow channel open/close unit 36 is in the open state y1, a state is entered in which the spool of the first flow channel open/close unit 36 has moved to the maximum limit. Furthermore, the opening area of the first flow channel open/close unit 36 in this state is set to meet a required value for a warm-up. The first flow channel open/close unit 36 disconnects the first pump hydraulic circuit 51 and the first warm-up hydraulic circuit 55 in the closed state y2, and connects the first warm-up hydraulic circuit 55 to the tank circuit 53.

Moreover, the hydraulic drive system of the pipe layer 1 includes a second hydraulic pump 41, the second hydraulic motor 42, a second flow rate control unit 43, a second drive pilot pressure control unit 44, a second winch operation member 45, and a second flow channel open/close unit 46.

The second hydraulic pump 41 is driven by the engine 30 and discharges hydraulic fluid. A second pump hydraulic circuit 56 is connected to the second hydraulic pump 41. The second pump hydraulic circuit 56 is a hydraulic circuit through which passes the hydraulic fluid discharged from the second hydraulic pump 41. The second hydraulic pump 41 is a variable displacement type of hydraulic pump that can control displacement by controlling the tilt angle of a swash plate. The displacement of the second hydraulic pump 41 is controlled by a belowmentioned second pump displacement adjustment unit 62.

The second hydraulic motor 42 is driven by the hydraulic fluid from the second hydraulic pump 41. The second hydraulic motor 42 drives the second winch 22. A second pump hydraulic circuit 57 is connected to the second hydraulic motor 42. The second drive hydraulic circuit 57 is a hydraulic circuit through which passes the hydraulic fluid for driving the second hydraulic motor 42. The second hydraulic motor 42 is supplied with the hydraulic fluid from the second hydraulic pump 41 via the second drive hydraulic circuit 57.

The second flow rate control unit 43 is provided between the second pump hydraulic circuit 56 and the second drive hydraulic circuit 57. The second flow rate control unit 43 is a pressure proportional control valve and adjusts the flow rate of the hydraulic fluid fed from the second pump hydraulic circuit 56 to the second drive hydraulic circuit 57 in response to a pilot pressure inputted to pilot ports p4 and p5. The second flow rate control unit 43 is switched between states z1, z2, z3 in response to the pilot pressure inputted to the pilot ports p4 and p5. In the state z1, the second flow rate control unit 43 drives the second hydraulic motor 42 in a direction for the second winch 22 to raise the second wire 102. In the state z2, the second flow rate control unit 43 drives the second hydraulic motor 42 in a direction for the second winch 22 to lower the second wire 102. In the state z3, the second flow rate control unit 43 disconnects the second drive hydraulic circuit 57 from the second pump hydraulic circuit 52 and connects the second drive hydraulic circuit 57 to the tank circuit 53. Therefore, when the second flow rate control unit 43 is in the state z3, the second hydraulic motor 42 is not driven, and further a brake is used in combination so that the second winch 22 enters a stopped state.

The second drive pilot pressure control unit 44 is a pressure proportional control valve for adjusting a pilot pressure inputted to the pilot ports p4 and p5 of the second flow rate control unit 43 in response to operation of the second winch operation member 45. The second winch operation member 45 is disposed in the cab 12 and is a member for the operator to operate the second winch 22. The second winch operation member 45 is, for example, a levered member. The second winch operation member 45 can be operated at a raised operating position, a lowered operating position, and a neutral position. The second drive pilot pressure control unit 44 is disposed between the third pump hydraulic circuit 54 and pilot pressure circuits pc3 and pc4. The pilot pressure circuits pc3 and pc4 are respectively connected to the pilot ports p4 and p5 of the second flow rate control unit 43. The second drive pilot pressure control unit 44 and the first drive pilot pressure control unit 34 constitute a drive pilot pressure control device 40.

The second flow channel open/close unit 46 is provided between the second pump hydraulic circuit 56 and a second warm-up hydraulic circuit 58. The second warm-up hydraulic circuit 58 is a hydraulic circuit through which the hydraulic fluid for warming up the second hydraulic motor 42 passes, and is provided with a throttle 49 as a second pressure loss portion. The hydraulic fluid flowing through the second warm-up hydraulic circuit 58 becomes heated by passing through the throttle 49. The second warm-up hydraulic circuit 58 branches into a second motor warm-up circuit 58a and a second winch warm-up circuit 58b. The second motor warm-up circuit 58a passes through the inside of the second hydraulic motor 42. The second winch warm-up circuit 58b passes through the inside of the second winch 22. Moreover, the second warm-up hydraulic circuit 58 is connected to a third warm-up hydraulic circuit 59. The third warm-up hydraulic circuit 59 passes through the inside of the abovementioned drive pilot pressure control device 40. The second flow channel open/close unit 46 is a directional control valve and is switched between an open state w1 and a closed state w2 in response to a pilot pressure inputted to a pilot port p6. In the open state w1, the second flow channel open/close unit 46 allows communication between the second pump hydraulic circuit 56 and the second warm-up hydraulic circuit 58. When the second flow channel open/close unit 46 is in the open state w1, a state is entered in which the spool of the second flow channel open/close unit 46 has moved to the maximum limit. Furthermore, the opening area of the second flow channel open/close unit 46 in this state is set to meet a required value for a warm-up. In the closed state w2, the second flow channel open/close unit 46 disconnects the second pump hydraulic circuit 56 and the second warm-up hydraulic circuit 58, and connects the second warm-up hydraulic circuit 58 to the tank circuit 53.

Furthermore, the hydraulic drive system of the pipe layer 1 includes a warm-up pilot pressure control unit 71, a warm-up permission operating member 72, and an oil temperature switch 73.

The warm-up pilot pressure control unit 71 adjusts the pilot pressures inputted to the pilot port p3 of the first flow channel open/close unit 36 and to the pilot port p6 of the second flow channel open/close unit 46 in order to switch both the first flow channel open/close unit 36 and the second flow channel open/close unit 46 to open states when the pipe layer 1 enters a warm-up start state. The warm-up start state includes at least the first winch operation member 35 and the second winch operation member 45 being in the neutral position. The warm-up pilot pressure control unit 71 includes a pilot circuit open/close unit 74, a pilot pressure detecting unit 75, and a solenoid switching unit 76.

The pilot circuit open/close unit 74 is a directional control valve and is switched between an open state v1 and a closed state v2 in response to a pilot pressure inputted to a pilot port p7. The pilot circuit open/close unit 74 allows communication between a pilot pressure circuit pc5 and a pilot pressure circuit pc6 in the open state v1. The pilot pressure circuit pc5 is connected to the abovementioned pilot port p3 of the first flow channel open/close unit 36 and the pilot port p6 of the second flow channel open/close unit 46. The pilot pressure circuit pc6 is connected to the third pump hydraulic circuit 54 via the solenoid switching unit 76. The pilot circuit open/close unit 74 disconnects the pilot pressure circuit pc5 and the pilot pressure circuit pc6 in the closed state v2, and connects the pilot pressure circuit pc5 to the tank circuit 53.

The pilot pressure detecting unit 75 is constituted by a plurality of shuttle valves. The pilot pressure detecting unit 75 outputs the largest pilot pressure among the pilot pressures of the pilot pressure circuits pc1 and pc2 and the pilot pressure circuits pc3 and pc4 to the pilot port p7 of the pilot circuit open/close unit 74 when at least one of the first winch operation member 35 and the second winch operation member 45 is operating (that is, when an operating member is in a drive position). As a result, the pilot circuit open/close unit 74 enters the closed state v2. Further, the pilot pressure detecting unit 75 does not output any pilot pressure among the pilot pressures of the pilot pressure circuits pc1 and pc2 and the pilot pressure circuits pc3 and pc4 to the pilot port p7 of the pilot circuit open/close unit 74 when both the first winch operation member 35 and the second winch operation member 45 are in the neutral position. As a result, the pilot circuit open/close unit 74 enters the open state v1. In other words, warming up is conducted when the pilot pressure detecting unit 75 detects that neither the first winch 21 nor the second winch 22 are being driven. When at least one of the first winch operation member 35 and the second winch operation member 45 is moved from the neutral position, the warming up is cancelled. Specifically, the fact that the first winch operation member 35 and the second winch operation member 45 are in the neutral position is a necessary condition for warming up. As a result, loss of power due to the warm-up procedure can be avoided while the winch is being operated.

Meanwhile, the pilot pressure to cause the pilot circuit open/close unit 74 to operate is set to be lower than the pilot pressure to cause the first flow rate control unit 33 and the second flow rate control unit 43 to operate. Consequently, when the first winch operation member 35 or the second winch operation member 45 is moved from the neutral position to a drive position when the pilot circuit open/close unit 74 is in the open state v1, the pilot circuit open/close unit 74 enters the closed state v2 before the first winch 21 or the second winch 22 is driven and the warm-up enters a stopped state. Conversely, when the first winch operation member 35 and the second winch operation member 45 are moved from a drive position to the neutral position when the pilot circuit open/close unit 74 is in the closed state v2, the first flow rate control unit 33 enters the state x3 and the second flow rate control unit 43 enters the state z3. Then, after the first winch 21 and the second winch 22 stop, the pilot circuit open/close unit 74 enters the open state v1 and the warm-up is conducted.

The solenoid switching unit 76 switches between an open state u1 and a closed state u2 due to the presence or absence of an electrical signal input to an electrode e1. The solenoid switching unit 76 enters the open state u1 when an electrical signal is inputted to the electrode e1. The solenoid switching unit 76 allows communication between the pilot pressure circuit pc6 and the third pump hydraulic circuit 54 in the open state u1. The solenoid switching unit 76 enters the closed state u2 when no electrical signal is inputted to the electrode e1. The solenoid switching unit 76 disconnects the pilot pressure circuit pc6 and the third pump hydraulic circuit 54 in the closed state u2, and allows communication between the pilot pressure circuit pc6 and the tank circuit 53.

The warm-up permission operating member 72 is a member operated by the operator, and may be, for example, a push button switch or a sliding switch. The warm-up permission operating member 72 is switched between a permitted state and a non-permitted state. The warm-up permission operating member 72 inputs an electrical signal to the electrode e1 of the solenoid switching unit 76 in the permitted state. As a result, the solenoid switching unit 76 enters the open state u1 and the flow channel open/close units are permitted to enter open states. The warm-up permission operating member 72 does not input an electrical signal to the electrode e1 of the solenoid switching unit 76 in the non-permitted state. As a result, the solenoid switching unit 76 enters the closed state u2 and the flow channel open/close units are not permitted to enter open states.

The oil temperature switch 73 turns power on for inputting the electrical signal to the electrode e1 of the solenoid switching unit 76 when a predetermined set temperature of the hydraulic fluid temperature is low. In addition, the oil temperature switch 73 turns power off for inputting the electrical signal to the electrode e1 of the solenoid switching unit 76 when the hydraulic fluid temperature rises to a predetermined set temperature. As a result, the solenoid switching unit 76 enters the open state u2 regardless of the state of the warm-up permission operating member 72.

According to the above, the pilot circuit open/close unit 74 enters the open state v1 and the solenoid switching unit 76 enters the open state u1 when both the first winch operation member 35 and the second winch operation member 45 are in the neutral position, the warm-up permission operating member 72 is in the permitted state, and the hydraulic fluid temperature is lower than a predetermined set temperature. As a result, the pilot pressure is inputted from the third pump hydraulic circuit 54 through the pilot pressure circuit pc6 and the pilot pressure circuit pc5 to the pilot port p3 of the first flow channel open/close unit 36 and to the pilot port p6 of the second flow channel open/close unit 46. As a result, the first flow channel open/close unit 36 enters the open state y1 and the hydraulic fluid for warm-up is supplied from the first pump hydraulic circuit 51 through the first warm-up hydraulic circuit 55 to the first hydraulic motor 32 and the first winch 21. In addition, the second flow channel open/close unit enters the open state w1 and the hydraulic fluid for warm-up is supplied from the second pump hydraulic circuit 56 through the second warm-up hydraulic circuit 58 to the second hydraulic motor 42 and the second winch 22. Furthermore, hydraulic fluid for warm-up is supplied from the second pump hydraulic circuit 56 through the second warm-up hydraulic circuit 58 and the third warm-up hydraulic circuit 59 to the drive pilot pressure control device 40.

On the other hand, when at least one of the first winch operation member 35 and the second winch operation member 45 is in an operating position other than the neutral position, the pilot circuit open/close unit 74 enters the closed state v2. As a result, the pilot pressure is not inputted from the third pump hydraulic circuit 54 to the pilot port p3 of the first flow channel open/close unit 36, and the first flow channel open/close unit 36 is held in the closed state y2. In addition, the pilot pressure is not inputted from the third pump hydraulic circuit 54 to the pilot port p6 of the second flow channel open/close unit 46, and the second flow channel open/close unit 46 is held in the closed state w2. Therefore, warm-up is not conducted.

Further, when the warm-up permission operating member 72 is in the non-permitted state, the solenoid switching unit 76 enters the closed state u2. At this time, the pilot pressure is not inputted from the third pump hydraulic circuit 54 to the pilot port p3 of the first flow channel open/close unit 36 or to the pilot port p6 of the second flow channel open/close unit 46. Thus, warm-up is not conducted. Moreover, the solenoid switching unit 76 enters the closed state u2 even when the hydraulic fluid temperature rises to the predetermined set temperature so that the electrical power is turned off due to the oil temperature switch 73. As a result, warm-up is also not conducted in this case. Therefore, the abovementioned warm-up start state is a state in which both the first winch operation member 35 and the second winch operation member 45 are in the neutral position, the warm-up permission operating member 72 is in the permitted state, and the hydraulic fluid temperature is lower than the predetermined set temperature.

The following is an explanation of the first pump displacement adjustment unit 61 for adjusting the displacement of the first hydraulic pump 31, and of the second pump displacement adjustment unit 62 for adjusting the displacement of the second hydraulic pump 41.

The first pump displacement adjustment unit 61 is constituted as a so-called closed center/load-sensing system (CLSS). The first pump displacement adjustment unit 61 includes a first servo piston 63 and a first displacement control valve 64 (indicated below as a first LS valve 64).

The first servo piston 63 is coupled with the swash plate of the first hydraulic pump 31. A hydraulic pressure A of the first pump hydraulic circuit 51 and a load pressure a3 are inputted to a pilot port of the first LS valve 64. The first LS valve 64 adjusts the piston position of the first servo piston 63 so that a pressure differential between the hydraulic pressure A of the first pump hydraulic circuit 51 and the toad pressure a3 becomes constant at a predetermined set pressure. As a result, the angle of the swash plate is controlled so that the pressure differential between the hydraulic pressure A of the first pump hydraulic circuit 51 and the load pressure a3 becomes constant at a predetermined set pressure. The hydraulic pressure A of the first pump hydraulic circuit 51 corresponds to a discharge pressure of the first hydraulic pump 31. The abovementioned set pressure is set by an elastic force of a spring which is not shown provided in the first LS valve 64. Further, the load pressure a3 is a pressure outputted by a first load pressure selecting unit 65. The first load pressure selecting unit 65 is constituted by a shuttle valve. The first load pressure selecting unit 65 outputs, as the load pressure a3, the largest hydraulic pressure between a hydraulic pressure a1 of the first drive hydraulic circuit 52 and a hydraulic pressure a2 of the first warm-up hydraulic circuit 55. The hydraulic fluid outputted by the first load pressure selecting unit 65 is supplied to the pilot port of the first LS valve 64. As a result, the largest hydraulic pressure among the hydraulic pressure a1 of the first drive hydraulic circuit 52 and the hydraulic pressure a2 of the first warm-up hydraulic circuit 55 is inputted as the load pressure a3 to the pilot port of the first LS valve 64.

Therefore, when the first flow channel open/close unit 36 is in the closed state, the first LS valve 64 adjusts the displacement of the first hydraulic pump 31 so that the differential pressure between the hydraulic pressure A of the first pump hydraulic circuit 51 and the hydraulic pressure a1 of the first drive hydraulic circuit 52 becomes constant at the set pressure. As a result, when at least one of the first winch 21 and the second winch 22 is being driven, the displacement of the first hydraulic pump is adjusted so that the differential pressure between the hydraulic pressure A of the first pump hydraulic circuit 51 and the hydraulic pressure a1 of the first drive hydraulic circuit 52 becomes constant at the set pressure.

Further, when the first flow channel open/close unit 36 is in the open state, the first LS valve 64 adjusts the displacement of the first hydraulic pump 31 so that the differential pressure between the hydraulic pressure A of the first pump hydraulic circuit 51 and the hydraulic pressure a2 of the first warm-up hydraulic circuit 55 becomes constant at the set pressure. As a result, when warm-up is being conducted, the displacement of the first hydraulic pump 31 is adjusted so that the differential pressure between the hydraulic pressure A of the first pump hydraulic circuit 51 and the hydraulic pressure a2 of the first warm-up hydraulic circuit 55 becomes constant at the set pressure.

The second pump displacement adjustment unit 62 is constituted as a so-called closed center/load-sensing system (CLSS) in the same way as the first pump displacement adjustment unit 61. The second pump displacement adjustment unit 62 includes a second servo piston 66 and a second displacement control valve 67 (indicated below as a second LS valve 67).

The second servo piston 66 is coupled with the swash plate of the second hydraulic pump 41. A hydraulic pressure B of the second pump hydraulic circuit 56 and a load pressure b3 are inputted to a pilot port of the second LS valve 67. The second LS valve 67 adjusts the piston position of the second servo piston 66 so that the differential pressure between the hydraulic pressure B of the second pump hydraulic circuit 56 and the load pressure b3 becomes constant at a predetermined set pressure. As a result, the angle of the swash plate is controlled so that the pressure differential between the hydraulic pressure B of the second pump hydraulic circuit 56 and the load pressure b3 becomes constant at the predetermined set pressure. The hydraulic pressure B of the second pump hydraulic circuit 56 corresponds to a discharge pressure of the second hydraulic pump 41. The abovementioned set pressure is set by an elastic force of a spring (not shown) provided in the second LS valve 67. The load pressure b3 is a pressure outputted by a second load pressure selecting unit 68. The second load pressure selecting unit 68 is constituted by a shuttle valve. The second load pressure selecting unit 68 outputs, as the load pressure b3, the larger of a hydraulic pressure b1 of the second drive hydraulic circuit 57 and a hydraulic pressure b2 of the second warm-up hydraulic circuit 58. The hydraulic fluid outputted by the second load pressure selecting unit 68 is supplied to the pilot port of the second LS valve 67. As a result, the larger of the hydraulic pressure b1 of the second drive hydraulic circuit 57 and the hydraulic pressure b2 of the second warm-up hydraulic circuit 58 is inputted as the load pressure b3 in the pilot port of the second LS valve 67.

Therefore, when the second flow channel open/close unit 46 is in the closed state, the second LS valve 67 adjusts the displacement of the second hydraulic pump 41 so that the differential pressure between the hydraulic pressure B of the second pump hydraulic circuit 56 and the hydraulic pressure b1 of the second drive hydraulic circuit 57 becomes constant at the set pressure. As a result, when at least one of the first winch 21 and the second winch 22 is being driven, the displacement of the second hydraulic pump 41 is adjusted so that the differential pressure between the hydraulic pressure B of the second pump hydraulic circuit 56 and the hydraulic pressure b1 of the second drive hydraulic circuit 57 becomes constant at the set pressure.

Further, when the second flow channel open/close unit 46 is in the open state, the second LS valve 67 adjusts the displacement of the second hydraulic pump 41 so that the differential pressure between the hydraulic pressure B of the second pump hydraulic circuit 56 and the hydraulic pressure b2 of the second warm-up hydraulic circuit 58 becomes constant at the set pressure. As a result, when warm-up is being conducted, the displacement of the second hydraulic pump 41 is adjusted so that the differential pressure between the hydraulic pressure B of the second pump hydraulic circuit 56 and the hydraulic pressure b2 of the second warm-up hydraulic circuit 58 becomes constant at the set pressure.

Meanwhile, the third hydraulic pump 29 is driven by the engine 30 to discharge hydraulic fluid. The hydraulic fluid discharged by the third hydraulic pump 29 is supplied through the drive pilot pressure control device 40 to the pilot ports of the first flow rate control unit 33, the second flow rate control unit 43, the first flow channel open/close unit 36, and the second flow channel open/close unit 46. The third hydraulic pump 29 is a fixed displacement hydraulic pump having a constant displacement. Therefore, the discharge flow rate of the hydraulic fluid from the third hydraulic pump 29 changes in response to the engine rotational speed.

The warm-up method of the pipe layer 1 will be described below. The following explanation assumes that the warm-up permission operating member 72 is in the permitted state unless otherwise indicated.

First, the hydraulic fluid temperature is lower than the set temperature immediately after starting the engine 30 of the pipe layer 1. Moreover, both the first winch operation member 35 and the second winch operation member 45 are disposed in the neutral position. At this time, the pilot circuit open/close unit 74 is in the open state v1, and the solenoid switching unit 76 is in the open state u1. As a result, the pilot pressure is inputted from the third pump hydraulic circuit 54 through the pilot pressure circuit pc6 and the pilot pressure circuit pc5 to the pilot port p3 of the first flow channel open/close unit 36 and to the pilot port p6 of the second flow channel open/close unit 46. As a result, the first flow channel open/close unit 36 enters the open state y1 and the hydraulic fluid is supplied from the first pump hydraulic circuit 51 through the first warm-up hydraulic circuit 55 to the first hydraulic motor 32 and the first winch 21. The hydraulic fluid flowing through the first warm-up hydraulic circuit 55 becomes heated by passing through the throttle 39. The first hydraulic motor 32 and the first winch 21 are warmed up by the heated hydraulic fluid passing through the first hydraulic motor 32 and the first winch 21. In addition, the second flow channel open/close unit enters the open state w1 and the hydraulic fluid is supplied from the second pump hydraulic circuit 56 through the second warm-up hydraulic circuit 58 to the second hydraulic motor 42 and the second winch 22. Furthermore, the hydraulic fluid is supplied from the second pump hydraulic circuit 56 through the second warm-up hydraulic circuit 58 and the third warm-up hydraulic circuit 59 to the drive pilot pressure control device 40. The hydraulic fluid flowing through the second warm-up hydraulic circuit 58 becomes heated by passing through the throttle 49. The second hydraulic motor 42, the second winch 22, and the drive pilot pressure control device 40 are warmed up due to the heated hydraulic fluid passing through the second hydraulic motor 42, the second winch 22, and the drive pilot pressure control device 40.

Additionally, the hydraulic pressure a2 of the first warm-up hydraulic circuit 55 is larger than the pressure a1 of the first drive hydraulic circuit 52 during the warm-up of the first hydraulic motor 32 and the first winch 21. As a result, the hydraulic pressure a2 of the first warm-up hydraulic circuit is inputted as the load pressure a3 to the first LS valve 64. Accordingly, the displacement of the first hydraulic pump 31 is adjusted so that the pressure differential between the first pump hydraulic circuit 51 and the first warm-up hydraulic circuit 55 becomes constant at the set pressure regardless of the engine rotational speed. Moreover, the hydraulic pressure b2 of the second warm-up hydraulic circuit 58 is larger than the hydraulic pressure b1 of the second drive hydraulic circuit 57 during the warm-up of the second hydraulic motor 42, the second winch 22, and the drive pilot pressure control device 40. As a result, the hydraulic pressure b2 of the second warm-up hydraulic circuit is inputted as the load pressure b3 to the second LS valve 67. Accordingly, the displacement of the second hydraulic pump 41 is adjusted so that the pressure differential between the second pump hydraulic circuit 56 and the second warm-up hydraulic circuit 58 becomes constant at the set pressure regardless of the engine rotational speed. Therefore, hydraulic fluid with a suitable flow rate necessary for the warm-up can be supplied to the first warm-up hydraulic circuit 55 and the second warm-up hydraulic circuit 58 even if the engine rotational speed is low.

When the hydraulic fluid temperature rises due to the warm-up to reach the set temperature, the electrical source of the solenoid switching unit 76 is turned off by the oil temperature switch 73. As a result, the solenoid switching unit 76 enters the closed state u2 and the warm-up is stopped.

The following is an explanation about the operation of the pipe layer 1 during an operation to lift the pipe 100 (referred to below as "lifting operation") by winding up the first winch 21 in accordance with an operation of the first winch operation member 35 by the operator. During the lifting operation, the pilot circuit open/close unit 74 enters the closed state v2 since the first winch operation member 35 is being operated. As a result, the pilot pressure is not inputted from the third pump hydraulic circuit 54 to the pilot port p3 of the first flow channel open/close unit 36, and the first flow channel open/close unit 36 is held in the closed state y2. Therefore, warm-up of the first hydraulic motor 32 and the first winch 21 is not conducted. In addition, the pilot pressure is not inputted from the third pump hydraulic circuit 54 to the pilot port p6 of the second flow channel open/close unit 46, and the second flow channel open/close unit 46 is held in the closed state w2. Therefore, the warm-up of the second hydraulic motor 42, the second winch 22, and the drive pilot pressure control device 40 is not conducted.

Additionally, the hydraulic pressure a1 of the first drive hydraulic circuit 52 is larger than the hydraulic pressure a2 of the first warm-up hydraulic circuit 55 while the first winch 21 is being driven. As a result, the hydraulic pressure a1 of the first drive hydraulic circuit 52 is inputted as the load pressure a3 to the first LS valve 64. Accordingly, the displacement of the first hydraulic pump 31 is adjusted so that the pressure differential between the first pump hydraulic circuit 51 and the first drive hydraulic circuit 52 becomes constant at the set pressure regardless of the engine rotational speed. Accordingly, a suitable hydraulic fluid flow rate necessary for driving the first winch 21 can be supplied to the first drive hydraulic circuit 52.

Warm-up is not conducted while the operation to wind down the first winch 21 to lower the pipe 100 is being conducted in accordance with the operation of the first winch operation member 35 by the operator in the same way as described above. Warm-up is not conducted while the boom 4 is being raised or lowered due to the operation of the second winch operation member 45 by the operator in the same way as described above.

The following is an explanation about the operation of the pipe layer 1 while the first winch 21 is stopped and the pipe 100 is held in a lifted state (referred to below as "lifting hold state") due to the operator placing the first winch operation member 35 in the neutral position. In the lifting hold state, both the first winch operation member 35 and the second winch operation member 45 are disposed in the neutral position. Furthermore, the hydraulic fluid temperature drops to a temperature lower than the set temperature when a long period of time passes while the pipe layer 1 is in the lifting hold state in an extremely cold environment. At this time, the pilot circuit open/close unit 74 enters the open state v1, and the solenoid switching unit 76 enters the open state u1. As a result, warm-up of the first hydraulic motor 32 and the first winch 21 is conducted in the same way as described above.

Moreover, the warm-up of the second hydraulic motor 42, the second winch 22, and the drive pilot pressure control device 40 are also conducted. Accordingly, when the operation of the first winch 21 and the operation of the second winch 22 are subsequently restarted, the first winch 21 and the second winch 22 can be promptly and accurately driven.

The pipe layer 1 according to the present embodiment has the following features.

Switching between the execution and stoppage of a warm-up is made possible by switching the first flow channel open/close unit 36 between an open state and a closed state. At this time, the execution and stoppage of a warm-up are switched by the spool moving to the maximum limit in the first flow channel open/close unit 36. Thus, fine adjustment of the opening area of the first flow channel open/close unit 36 is not required. Specifically, control of the spool stroke amount or the throttle amount when the throttle is variable is unnecessary. In the same way as the first flow channel open/close unit 36, fine adjustment of the opening area of the second flow channel open/close unit 46 is unnecessary. Moreover, since the fine-tuning of the opening area is unnecessary, control of the first flow channel open/close unit 36 and the second flow channel open/close unit 46 can be carried out by a hydraulic pressure pilot without relying on an electronic device. Furthermore, since the accuracy of the opening area for warming up depends only upon the processing accuracy of the spool, variation in opening areas between the various devices is easily reduced and reliable warm-up performance can be achieved. As a result, a reliable warm-up can be conducted even in an extremely cold environment.

The displacement of the first hydraulic pump 31 is adjusted so that the pressure differential between the first pump hydraulic circuit 51 and the first warm-up hydraulic circuit 55 becomes constant at the set pressure when the first flow channel open/close unit 36 is in the open state. Specifically, when a warm-up is being conducted, the displacement of the first hydraulic pump 31 can be adjusted in response to the hydraulic pressure a2 of the first warm-up hydraulic circuit 55 even when the engine rotational speed is reduced. For the second hydraulic pump 41, the displacement of the second hydraulic pump 41 is adjusted in response to the hydraulic pressure b2 of the second warm-up hydraulic circuit 58 in the same way as the first hydraulic pump 31. Therefore, a hydraulic fluid flow rate required for warm-up can be suitably assured even when the pipe layer 1 is in the lifting hold state. As a result, an adequate amount of heat can be assured while the pipe layer is in the lifting hold state.

A warm-up dedicated to the first flow channel open/close unit 36 and the first warm-up hydraulic circuit 55 is provided independently from the first flow rate control unit 33 and the first drive hydraulic circuit 52 for controlling the drive of the first hydraulic motor 32. Moreover, a warm-up dedicated to the second flow channel open/close unit 46 and the second warm-up hydraulic circuit 58 is provided independently from the second flow rate control unit 43 and the second drive hydraulic circuit 57 for controlling the drive of the second hydraulic motor 42. As a result, even if a failure occurs in a hydraulic circuit for warming up, the impact on the operation of the first winch 21 and the second winch 22 can be suppressed. Warming up can be put into a stopped state when operating either the first winch 21 or the second winch 22. As a result, the discharge horsepower of the first hydraulic pump 31 and the second hydraulic pump 41 can be effectively used in driving the winches 21 and 22. Furthermore, operability of the winches 21 and 22 can be improved since the first flow rate control unit 33 and the second flow rate control unit 43 can be controlled without any constraint for warming up.

If the operator causes the warm-up permission operating member 72 to enter the permitted state, a warm-up can be conducted automatically. As a result, the operational burden on the operator can be suppressed. Moreover, when a vehicle in which the hydraulic drive system is controlled by an electronic control device is used in an extremely cold environment where the temperature reaches −50 degrees Celsius, there is a need to conduct preheating of the electronic control device using a heater when starting the engine 30. Since this operation is required independently of the warm-up of the hydraulic drive devices, the operation is complicated and the burden on the operator is large. However, in the pipe layer 1 according to the present embodiment, preheating is unnecessary since the control of the hydraulic drive system is conducted without using an electronic control device. The bother of conducting preheating is therefore removed.

The setting of permission and non-permission for executing a warm-up can be conducted by the operator operating the warm-up permission operating member 72. As a result, unnecessary warm-ups being conducted based on the resolve of the operator can be suppressed. Accordingly, fuel consumption can be improved.

A warm-up is stopped by the oil temperature switch 73 when the hydraulic fluid temperature rises up to a set temperature. As a result, unnecessarily continuing the warm-up can be suppressed. Accordingly, fuel consumption can be improved.

Although an embodiment of the present invention has been described so far, the present invention is not limited to the above embodiments and various modifications may be made within the scope of the invention.

For example, the hydraulic circuits of the hydraulic drive system are not limited to those described above and equivalent hydraulic circuits may be used. The forms of the above-mentioned operating members are not limited to a lever and a switch, and thus other forms may be adopted. The warm-ups of the first hydraulic motor 32 and the second hydraulic motor 42 are described as being conducted concurrently in the above embodiment; however the warm-ups may also be conducted separately.

Although the throttles 39 and 49 are used as pressure loss portions for heating in the above embodiment, relief valves set to a predetermined relief pressure may also be used. Although the warm-up permission operating member 72 inputs an electric signal to the solenoid switching unit 76 in the above embodiment, a lock valve that manually opens and closes a hydraulic circuit may be disposed in the flow channel open/close unit instead.

Although warm-up of the first hydraulic motor 32 and the first winch 21 is conducted in the above embodiment, only the first hydraulic motor 32 may be warmed up. Moreover, if the first hydraulic motor 32 and the first winch 21 are disposed in proximity, the first hydraulic motor 32 may be warmed up by warming up the first winch 21. The second hydraulic motor 42 and the second winch 22 are similar to the first hydraulic motor 32 and the first winch 21. Further, the warm-up of either the first hydraulic motor 32 or the second hydraulic motor 42 may be conducted.

The conditions for the pipe layer 1 to be in the warm-up start state may include conditions other than the abovementioned three conditions. Further, among the abovementioned three conditions, the other conditions may be changed except for the condition that the first winch operation member 35 or the second winch operation member 45 is in the neutral position.

The illustrated embodiment provides a pipe layer and a warm-up method for a pipe layer that can reliably perform a warm-up even in an extremely cold environment and ensure an adequate amount of heat while holding a state in which the pipe layer is lifting a pipe.

What is claimed is:

1. A pipe layer comprising:
   an engine;
   a hydraulic pump driven by the engine;
   a hydraulic motor driven by hydraulic fluid discharged from the hydraulic pump;
   a winch driven by the hydraulic motor;
   a winch operation member for operating the winch;
   a pump hydraulic circuit connected to the hydraulic pump and through which the hydraulic fluid discharged from the hydraulic pump passes;
   a drive hydraulic circuit connected to the hydraulic motor and through which hydraulic fluid for driving the hydraulic motor passes;
   a warm-up hydraulic circuit provided with a pressure loss portion and through which hydraulic fluid for warming up the hydraulic motor passes;
   a flow rate control unit provided between the pump hydraulic circuit and the drive hydraulic circuit, and configured to adjust a flow rate of hydraulic fluid fed from the pump hydraulic circuit to the drive hydraulic circuit in response to an inputted pilot pressure;
   a drive pilot pressure control unit configured to adjust a pilot pressure inputted to the flow rate control unit in response to an operation of the winch operation member;
   a flow channel open/close unit provided between the pump hydraulic circuit and the warm-up hydraulic circuit, and configured to be switched between an open state in which the pump hydraulic circuit and the warm-up hydraulic circuit are allowed to communicate and a closed state in which the pump hydraulic circuit and the warm-up hydraulic circuit are disconnected in response to an inputted pilot pressure;
   a warm-up pilot pressure control unit configured to, when a warm-up start state occurs under a necessary condition that the winch operation member is in a neutral position, adjust the pilot pressure inputted to the flow channel open/close unit so that the flow channel open/close unit is switched to the open state; and
   a pump displacement adjustment unit configured to, when the flow channel open/close unit is in the closed state, adjust a displacement of the hydraulic pump so that a differential pressure between the pump hydraulic circuit and the drive hydraulic circuit becomes constant at a predetermined set pressure, and when the flow channel open/close unit is in the open state, adjust the displacement of the hydraulic pump so that a differential pressure between the pump hydraulic circuit and the warm-up hydraulic circuit becomes constant at a predetermined set pressure.

2. The pipe layer according to claim 1, further comprising:
   a warm-up permission operating member that is operated in a permitted state in which the open state of the flow channel open/close unit is permitted and a non-permitted state in which the open state of the flow channel open/close unit is not permitted; wherein
   the warm-up start state further includes a condition that the warm-up permission operating member is in the permitted state.

3. The pipe layer according to claim 1, wherein
   the flow channel open/close unit enters the closed state when the winch operation member is moved to a position other than the neutral position when the flow channel open/close unit is in the open state.

* * * * *